2,929,807

POLYMERIZATION PROCESS FOR PRODUCING COPOLYMERS OF ETHYLENE AND HIGHER 1-OLEFINS

Gerald T. Leatherman and Paul E. Campbell, Bartlesville, Okla., assignors to Phillips Petroleum Company, a corporation of Delaware No Drawing. Application May 13, 1957
Serial No. 658,521

5 Claims. (Cl. 260—88.2)

This invention relates to the production of wax-like copolymers of ethylene and higher 1-olefins.

In accordance with this invention, it has been discovered that when ethylene is copolymerized with propylene or 1-butene in the presence of a catalyst comprising chromium oxide, including hexavalent chromium, associated with a carrier material selected from the group consisting of silica, alumina, thoria, zirconia, and composites thereof, a portion of the copolymer formed is soluble in cyclohexane at a temperature within the range of 70 to 100° F., whereas the remainder of the copolymer is not. Of course, the separated portion is soluble at higher temperatures. This wax-like polymer has the unique property of an extremely high drip melting point, generally about 200° F., or above, whereas the drip melting points of conventional paraffin waxes are generally within the range of 165 to 180° F. The polymer of this invention can thus be employed to advantage as candle wax and as a coating material, such as is used in manufacturing paper cups. The high drip melt point prevents candles from melting in warm climates and permits paper cups to be used with higher temperature liquids.

Accordingly, it is an object of this invention to provide a wax-like copolymer of ethylene and propylene or 1-butene which has a high drip melting point.

A further object is to provide a process for producing such a copolymer.

Other objects, advantages and features should become apparent from the following detailed description of present preferred embodiments of this invention.

The polymers of this invention are obtained by the copolymerization of ethylene with propylene or 1-butene, preferably in the presence of a diluent or solvent material. The amount of propylene or 1-butene which can be employed is in the range of 5 to 50% by weight of the total monomers charged to the polymerization reactor. For optimum results it is preferred that the amount of propylene or 1-butene employed be in the range of approximately 10 to 20% by weight of the total monomers. The reaction can be carried out at a temperature in the range of approximately 160 to 300° F., although a temperature in the range of 200 to 280° F. is preferred. The molecular weight of the resulting copolymer which is soluble in cyclohexane at a temperature in the range of 70 to 100° F. generally increases as the reaction temperature is lowered. The amount of this copolymer produced generally increases as the concentration of propylene or 1-butene in the feed mixture increases. The reaction is normally carried out at a sufficient pressure to insure that a liquid phase is maintained. This generally can be accomplished by pressures less than 500 pounds per square inch gauge, depending upon the polymerization temperature. However, pressures up to 700 to 1000 pounds per square inch gauge or even higher, can be employed, if desired. Furthermore, the reaction can be carried out in the gaseous phase in which the pressure can be as low as one atmosphere. The feed rate employed in the liquid phase process with a fixed bed catalyst can be in the general range of about 0.1 to 20 volumes of feed per volume of catalyst. It is preferred that this rate be in the range of approximately 1 to 6 volumes of feed per volume of catalyst.

The use of a diluent in the polymerization reaction serves two useful purposes. Since the reactions are usually exothermic, the diluent provides a method for obtaining control of the reaction temperature. In addition, a portion of the total polymer formed may be tacky in nature so that the presence of a diluent tends to prevent adherence of this polymer to the walls of the reaction vessel and the recovery equipment. In general, the amount of diluent employed is relatively large compared to the olefin feed material. The olefin feed usually constitutes about 0.1 to 25% by weight of the mixture, although a range of about 2 to 15% by weight is preferred. The solvent or diluent which can be employed in the polymerization reactions of this invention includes aliphatic and cyclo aliphatic hydrocarbons. Such hydrocarbons having between 3 and 12 carbon atoms per molecule can be employed to advantage. Examples of these hydrocarbons include propane, isobutane, normal pentane, isopentane, isooctane, cyclohexane, methylcyclohexane, and the like. It is generally preferred not to employ aromatic diluents because these materials, or impurities therein, tend to shorten the catalyst life. However, aromatics can be employed if catalyst life is not an important factor.

The polymerization reaction can be carried out either as a fixed bed or as a mobile catalyst operation. One preferred method of conducting the polymerization reaction comprises contacting the olefin feed with a slurry of catalyst which is suspended in the solvent or diluent. It is preferred that the catalyst be maintained in suspension by suitable means, such as a mechanical agitator. In this type of operation, the effluent from the reaction zone contains polymer, catalyst and solvent. The catalyst is subsequently removed from the solvent and polymer by suitable filtering or flashing operations. The recovered solvent can be recycled to the reaction zone and the catalyst can be reused after regeneration in an oxidizing atmosphere to remove residual carbonaceous deposits and by reactivating at an elevated temperature. In the fixed bed type process, the liquid feed rate is normally maintained in the range of approximately 2 to 6 volumes per volume of catalyst. In the mobile catalyst operation, the catalyst concentration in the reaction zone is in the range of 0.01 to 10 percent by weight. The residence time is in the range of approximtely 15 minutes to 12 hours.

The catalyst employed in the process of this invention comprises chromium oxide, including hexavalent chromium associated with a support material comprising silica, alumina, thoria, zirconia or composites thereof, such as silica-alumina, silica-zirconia or the like. This catalyst can be prepared by contacting aqueous solutions of salts of chromium with the support material for a sufficient time to impregnate the support material. The excess liquid is then removed, as by filtering, for example, and the solid catalyst is dried and activated at temperatures in the range of 450 to 1500° F. under non-reducing conditions for several hours. However, the activating process can be carried out under reducing conditions if the hexavalent chromium content of the activated catalyst is at least 0.1% by weight. For a more detailed discussion of these catalysts, reference is made to the copending application of Hogan and Banks, Serial No. 573,877, filed March 26, 1956, now Patent 2,825,721.

As previously mentioned, the catalyst generally can be reused a number of times. When this is desired, the catalyst can first be washed with a hydrocarbon solvent, such as pentane or isooctane at a temperature in the range of 300 to 400° F. and under sufficient pressure to maintain the solvent in the liquid phase. Any remaining solid polymer or carbonaceous material is then burned from the catalyst by contacting the catalyst with air at a temperature in the range of 900 to 1100° F.

In the above-described process, only a portion of the final polymeric material is soluble in cyclohexane at a temperature in the range of 70 to 100° F. It is this portion of the polymer that is recovered in accordance with the present invention. As previously mentioned, the catalyst must be separated from the reactor effluent. This can be accomplished by the use of conventional filtering or separation processes. If cyclohexane is employed as the solvent in the polymerization reaction, the catalyst-free effluent can then be cooled to a temperature in the range of 70 to 100° F. The polymer which remains in solution is the polymer that is subsequently recovered in accordance with this invention. The polymer can be recovered by flashing off the cyclohexane solvent or by further cooling the mixture until the polymer precipitates out. If other solvents are employed in the polymerization process, the same procedure can be employed to recover the desired polymer except that the mixture is cooled to a corresponding temperature at which the desired polymer alone is in solution. This temperature can readily be determined for different solvents merely by mixing a part of the final product of this invention with the selected solvent at various temperatures and noting if the polymer is dissolved. If desired, the total polymer produced can be separated from the solvent by flashing or cooling procedures. The desired polymer can then be separated from the total polymer mass by contacting the total polymer with cyclohexane at a temperature in the range of 70 to 100° F.

The following example is illustrative of this invention.

EXAMPLE I

The catalyst employed in the polymerization reaction was prepared by impregnating a 20 to 60 mesh 90/10 silica-alumina composite with a 0.76 molar chromium trioxide solution. The excess liquid was drained and the catalyst was activated by contacting same with dry air for six hours at a temperature of approximately 950° F. The activated catalyst was protected from moisture by maintaining an atmosphere of dried nitrogen over the catalyst. An analysis of the catalyst showed a chromium content of 2.5 weight percent, of which 2.2 weight percent was hexavalent chromium.

A series of runs were made with feed mixtures comprising ethylene and varying amounts of 1-butene. These runs were carried out in a 1400 milliliter stirred reactor using the catalyst above-described. All of the catalyst and about two-thirds of the solvent were charged to the reactor at the beginning of the operation. Both the catalyst and a cyclohexane diluent were introduced under a blanket of dry nitrogen. Heat was applied to liberate fixed gases from the cyclohexane. The reactor was then closed and heated to the desired reaction temperature. Ethylene was metered into the reaction at the range of 80 grams per hour until the reaction pressure was reached, and was then added at a rate sufficient to maintain the pressure substantially constant. The 1-butene was charged to the reactor at a constant rate as a solution in cyclohexane. The amount of 1-butene introduced was determined by weighing the charged cylinder and the known concentration of cyclohexane. When the runs were completed, the flow of reactants was terminated and the heating was discontinued. The pressure was then decreased and the reaction products were removed. The catalyst was removed by filtering the reaction products at a temperature of 300° F. The runs were carried out for 4 to 5 hours at a pressure of 450 pounds per square inch gauge. The catalyst concentration in the reactor was maintained between 0.6 and 0.8 percent by weight of solvent.

The above-mentioned filtrate was then cooled to 80° F. to precipitate the polymer which was not soluble in cyclohexane at this temperature. The polymer which remained soluble in cyclohexane at 80° F. was subsequently removed from the cyclohexane by drying the solution in a vacuum oven at 210° F. The physical properties of the resulting polymer were as follows:

*Table I*

| Run | Reaction Temp., °F. | Weight percent, 1-Butene[1] | Weight percent Soluble Polymer | Density | Intrinsic Viscosity | Molecular Weight[2] | Drip Melt Point, °F. |
|---|---|---|---|---|---|---|---|
| 1 | 240 | 3.5 | 3.2 | [3] | 0.121 | 2,965 | [3] |
| 2 | 240 | 10.0 | 9.1 | 0.886 | 0.329 | 8,047 | 203 |
| 3 | 240 | 15.0 | 13.1 | 0.886 | 0.395 | 9,660 | 203 |
| 4 | 260 | 15.0 | 16.7 | 0.884 | 0.395 | 9,660 | 202 |
| 5 | 240 | 20.0 | 29.3 | 0.878 | 0.380 | 9,300 | 198 |

[1] 1-Butene in feed to reactor.
[2] Based on viscosity measurements.
[3] Not measured.

The drip melt points were measured by heating the samples to be measured to temperatures slightly above the melting point. The bulb of a mercury thermometer was dipped in the melted samples, withdrawn, and cooled so that a layer of the copolymer was present on the bulb. The bulb was then heated slowly over an electric hot plate. The temperature at which the first drop of copolymer fell from the thermometer bulb was recorded as the drip melt point.

EXAMPLE II

A similar run was made using a feed stream comprising 47 weight percent propylene and 53 weight percent ethylene. The reaction was carried out for 4 hours at a temperature of 200° F. A total of 383 grams of monomer was charged to the reactor. Approximately 241 grams of total polymer was produced, of which 48 weight percent was soluble in cyclohexane at 70 to 100° F. The molecular weight of this soluble polymer was 20,990.

The foregoing examples show that a portion of the polymer produced by the copolymerization of ethylene and propylene or 1-butene is soluble in cyclohexane at temperatures in the range of 70 to 100° F. This soluble polymer is particularly useful as a wax or coating material where a high drip melting point is desired.

While the invention has been described in conjunction with present preferred embodiments, it should be evident that it is not limited thereto.

What is claimed is:

1. A process for producing a copolymer which comprises reacting ethylene with a higher 1-olefin selected from the group consisting of propylene and 1-butene, said higher olefin comprising from 10 to 20% by weight of the total olefins reacted, in the presence of a catalyst comprising as the sole essential catalytic ingredients chromium oxide, including hexavalent chromium, on a support selected from the group consisting of silica, alumina, thoria, zirconia and composites thereof, at a temperature in the range of 160 to 300° F. and removing from the resulting product the copolymer which is soluble in cyclohexane at a temperature in the range of 70 to 100° F.

2. A process for producing a copolymer which comprises reacting ethylene with a higher 1-olefin selected from the group consisting of propylene and 1-butene, said higher olefin comprising from 10 to 20% by weight of the total olefins reacted, in the presence of a cyclohexane and a catalyst comprising as the sole catalytic ingredients chromium oxide, including hexavalent chromium, on a silica-alumina support, at a temperature in the range of 200 to 280° F., removing the catalyst from the resulting product, cooling the product to a temperature in the range of 70 to 100° F., separating the insoluble polymer from that in solution, and separating from the resulting solution the copolymer that is soluble in the cyclohexane at 70 to 100° F.

3. The process of claim 2 wherein said higher 1-olefin is propylene.

4. The process of claim 2 wherein said higher 1-olefin is 1-butene.

5. A process for producing a copolymer which comprises reacting ethylene with a higher 1-olefin selected from the group consisting of propylene and 1-butene, said higher olefin comprising from 10 to 20% by weight of the total olefins reacted, in the presence of a catalyst comprising, as the sole essential catalytic ingredients, chromium oxide, including hexavalent chromium supported on a silica-alumina support, and in the presence of a diluent selected from the group consisting of paraffins and cycloparaffins having from 3 to 12 carbon atoms per molecule, at a temperature in the range of 200 to 280° F. and removing from the resulting product the copolymer which is soluble in cyclohexane at a temperature in the range 70 to 100° F.

References Cited in the file of this patent

UNITED STATES PATENTS

| | | |
|---|---|---|
| 2,396,920 | Larson | Mar. 19, 1946 |
| 2,802,814 | Feller et al. | Aug. 13, 1957 |
| 2,825,721 | Hogan et al. | Mar. 4, 1958 |